United States Patent
Lv et al.

(10) Patent No.: US 9,771,509 B1
(45) Date of Patent: Sep. 26, 2017

(54) POLYMER ELASTIC PARTICLE RESERVOIR PROTECTING AGENT AND DRILLING FLUID CONTAINING THE SAME

(71) Applicant: China University of Petroleum (East China), Qingdao, Shangdong (CN)

(72) Inventors: Kaihe Lv, Shandong (CN); Jinsheng Sun, Shandong (CN); Jingping Liu, Shandong (CN)

(73) Assignee: China University of Petroleum (East China), Shandong (CN)

( * ) Notice: Subject to any disclaimer, the term of this patent is extended or adjusted under 35 U.S.C. 154(b) by 0 days.

(21) Appl. No.: 15/400,520

(22) Filed: Jan. 6, 2017

(30) Foreign Application Priority Data

Oct. 31, 2016 (CN) .......................... 2016 1 0931864

(51) Int. Cl.
C09K 8/24 (2006.01)
(52) U.S. Cl.
CPC ...................... *C09K 8/24* (2013.01)
(58) Field of Classification Search
None
See application file for complete search history.

(56) References Cited

U.S. PATENT DOCUMENTS

| | | | | |
|---|---|---|---|---|
| 3,199,591 A * | 8/1965 | Kepley | ................... | C09K 8/62 166/279 |
| 4,836,904 A * | 6/1989 | Armstrong | ........... | G01N 27/308 204/290.13 |
| 5,735,349 A * | 4/1998 | Dawson | ................. | C09K 8/512 166/294 |
| 6,169,058 B1 * | 1/2001 | Le | ........................... | C09K 8/62 166/308.4 |
| 2012/0298354 A1 * | 11/2012 | Sullivan | ............... | C08F 226/04 166/248 |
| 2013/0192826 A1 * | 8/2013 | Kurian | .................. | C09K 8/588 166/279 |

* cited by examiner

*Primary Examiner* — Alicia Bland
(74) *Attorney, Agent, or Firm* — Calfee, Halter & Griswold LLP

(57) ABSTRACT

The present invention relates to the technical field of petroleum drilling. An intermediate product of a reservoir protecting agent, a reservoir protecting agent, a preparing method and use thereof, a drilling fluid and use thereof are disclosed. The intermediate product of a reservoir protecting agent is made of raw materials comprising acrylamide, a cationic monomer, a cross-linking agent, an initiator, a toughening material and water, and based on the raw materials of 100 parts by weight, the use amounts of the acrylamide, the cationic monomer, the cross-linking agent, the initiator and the toughening material are respectively 8-30, 1-10, 0.01-0.5, 0.01-0.1, 5-25 parts by weight. The reservoir protecting agent includes the intermediate product of the present invention, base, salt, and water, and based on the reservoir protecting agent of 100 parts by weight, the use amounts of the intermediate product, base, and salt are respectively 5-40, 1-10, and 1-12 parts by weight. The reservoir protecting agent of the present invention has a good blocking effect and can improve the capability of the drilling fluid to protect the reservoir, enhance the capability of the drilling fluid to stabilize well walls.

20 Claims, 1 Drawing Sheet

POLYMER ELASTIC PARTICLE RESERVOIR PROTECTING AGENT AND DRILLING FLUID CONTAINING THE SAME

CROSS-REFERENCE TO RELATED APPLICATIONS

This application claims priority to Chinese Application No. 201610931864.4 filed on Oct. 31, 2016 entitled "Intermediate Product of Reservoir Protecting Agent, Reservoir Protecting Agent, Preparing Method And Use Thereof, Drilling Fluid And Use Thereof", which is hereby incorporated by reference as if recited in its entirety herein.

TECHNICAL FIELD

The present invention relates to the technical field of petroleum drilling, specifically, relates to a elastic polymer particle reservoir protecting agent and a drilling fluid containing the same, and more specifically, relates to an intermediate product of a reservoir protecting agent, a reservoir protecting agent, a preparing method and use thereof, and a drilling fluid and use thereof.

BACKGROUND

During the process of petroleum drilling, once the reservoir damage occurs, permeability of the reservoir is reduced, and flow resistance of oil gas is increased, so that the capacity of the oil gas well is reduced and accuracy of well testing and well logging interpretation is influenced, which may cause misinterpretation and missing of reservoir, thereby causing great economic damages, which are serious consequences. Therefore, it is crucial to protect the reservoir during the process of drilling well.

During the process of drilling well, the drilling fluid can easily invade the pore of the reservoir, through particle jam and (or) water-sensitive functions and the like, causing a reduction in reservoir permeability, and damaging the reservoir. During the process of drilling a well, adding a reservoir protecting agent into the drilling fluid is a commonly adopted method for protecting the reservoir. The conventional reservoir protecting agent is calcium carbonate.

The calcium carbonate is generally in the form of rigid particles, and after entering into the pore of the reservoir under the action of the pressure difference, follows the process of "selectively bridging, and filling step-by-step." The bridging function of calcium carbonate particles with larger size, the bridging and filling functions of calcium carbonate particles with smaller size, and the filling function of deformable particles (such as pitch) are required (see FIG. 1). A blocking layer with a permeability of almost zero is formed inside the void, which stops the drilling fluid from continuously invading the reservoir, thereby achieving the function of protecting the reservoir.

However, as a reservoir protecting agent, calcium carbonate has the following problems: (1) the calcium carbonate relates to rigid particles, the blocking effect is not ideal when using separately, and it is necessarily used with deformable particles such as the types of pitch; (2) the calcium carbonate enters into inside the pore of the reservoir for blocking, which requires strictly matching the diameter of the particle with the diameter of the pore of the reservoir, or the blocking effect is not good; and (3) the calcium carbonate enters into the pore of the reservoir for blocking, acidification and eliminating plugging are necessarily performed after the well is drilled, so that the blocking can be removed, the reservoir permeability is recovered, and the oil gas well can functionally produce.

SUMMARY

The present invention seeks to overcome the aforementioned defects associated with using calcium carbonate as a reservoir protecting agent, and to provide a elastic polymer particle reservoir protecting agent and a drilling fluid containing the same, and more specifically, the present invention provides an intermediate product of a reservoir protecting agent, a reservoir protecting agent, a preparing method and use thereof, a drilling fluid containing the reservoir protecting agent and use thereof. The reservoir protecting agent of the present invention has a rapid blocking speed, a wide blocking range, and good blocking effect, and blocks in a single direction without hindering removal operations, wherein the blocking is easily flew back and removed, and the reservoir protecting agent is adapted to protect the reservoir during the process of drilling well, and can improve the capability of the drilling fluid to protect the reservoir, and enhance the capability of the drilling fluid to stabilize the well walls.

In order to achieve the aforementioned purposes, in a first aspect, the present invention provides an intermediate product of a reservoir protecting agent, wherein the intermediate product of a reservoir protecting agent is made of raw materials comprising acrylamide, a cationic monomer, a cross-linking agent, an initiator, a toughening material and water, and based on the raw materials of 100 parts by weight, the acrylamide is present in 8-30 parts by weight, the cationic monomer is present in 1-10 parts by weight, the cross-linking agent is present in 0.01-0.5 parts by weight, the initiator is present in 0.01-0.1 parts by weight, and the toughening material is present in 5-25 parts by weight.

In a second aspect, the present invention provides a method for preparing the intermediate product of a reservoir protecting agent of the present invention, wherein the method comprises: mixing the acrylamide, the cationic monomer, the cross-linking agent, the toughening material and the water, adding the initiator into the obtained mixture for reaction, and then drying and smashing the reaction product.

In a third aspect, the present invention provides a reservoir protecting agent, wherein the reservoir protecting agent comprises an intermediate product, base, salt and water, and based on 100 parts by weight of the reservoir protecting agent, the intermediate product is present in 5-40 parts by weight, the base is present in 1-10 parts by weight, and the salt is present in 1-12 parts by weight, and wherein the intermediate product is the intermediate product of a reservoir protecting agent of the present invention.

In a fourth aspect, the present invention provides a method for preparing the reservoir protecting agent of the present invention, wherein the method comprises: mixing the intermediate product of a reservoir protecting agent of the present invention, the base, the salt, a selectable bactericide and the water.

In a fifth aspect, the present invention provides a drilling fluid, wherein the drilling fluid contains the reservoir protecting agent of the present invention.

In a sixth aspect, the present invention provides a use of the intermediate product of a reservoir protecting agent of the present invention or the reservoir protecting agent of the present invention or the drilling fluid of the present invention in drilling well of a reservoir section.

The reservoir protecting agent of the present invention is a elastic polymer particle reservoir protecting agent, which can effectively prevent the drilling fluid from invading the reservoir, and is adapted to protecting the reservoir during the process of drilling well, and can be adapted to the reservoir with pores and reservoir with cracks, the reservoir protecting agent has a high blocking rate and the blocking layer is easily flowback, and has advantages such as easy use, good environmental protection performances, and good protection performances for the reservoir. Moreover, the reservoir protecting agent of the present invention can be added into a drilling fluid system with any constituents according to requirements, and in addition to improving the capability of protecting the reservoir of the drilling fluid, it can also enhance the capability of stabilizing well walls of the drilling fluid, and is not detrimental to the remaining functions of the drilling fluid. Specifically, taking protection of the reservoir with pores as an example, the reservoir protecting agent of the present invention has the following remarkable advantages:

(1) Rapid blocking speed and high blocking success rate are provided. The elastic polymer particle reservoir protecting agent relates to irregularly-shaped, deformable, and durable elastic particles, which has better elasticity and tenacity, meanwhile, the diameter thereof is required to be larger than that of the pore of the reservoir (the reservoir protecting agent of corresponding granularity can be prepared according to actual using conditions). Since the diameter of the elastic particle is larger than that of the pore of the reservoir, under the action of the pressure difference, the elastic particle can be partially inserted into an entrance of the pore to block the pore, and the remaining part is still located outside the pore to function for blocking (see FIG. 2). Meanwhile, the deformable elastic particles have good adaptation for the voids with different shapes of entrances (the circular entrance, square entrance, oval entrance, and the like), overcoming the defect of the rigid particles which lack of deformability, and can rapidly generate blocking in the voids, thereby achieving the purpose of stopping the drilling fluid from continuously invading the reservoir.

(2) Unidirectional blocking is provided without blocking removal operations. The elastic polymer particle reservoir protecting agent is inserted at the entrance of the pore without substantially entering into the pore itself, and if a back pressure difference exists, the inserted blocking layer would be easily removed. Therefore, using the reservoir protecting agent of the present invention, a special jam removal measure is not required. After well completion, under the action of production pressure difference (negative pressure difference), the jam is easily removed, and the reservoir is recovered to the original permeability, without influencing the oil well capacity and without additional blocking removal operations.

(3) The applicable temperature and degree of mineralization have wide ranges. The elastic polymer particle reservoir protecting agent stably exists at a temperature range between the room temperature to 200° C., has a higher thermal stability, and can be applied to reservoirs with different well depths. The performances of the elastic polymer particle reservoir protecting agent are subjected to a few influences from the degree of mineralization, and can be applied to the saline water drilling fluid with hypersalinity.

Other characteristics and advantages of the present invention will be explained in the following part of detailed description of the embodiments in detail.

BRIEF DESCRIPTION OF THE DRAWINGS

The drawings are used for providing further understanding of the present invention, and constituting a part of the description, and are used together with the following detailed description of the embodiments to explain the present invention, but are not intended to limit the present invention. In the drawings.

DETAILED DESCRIPTION

Figure 1:
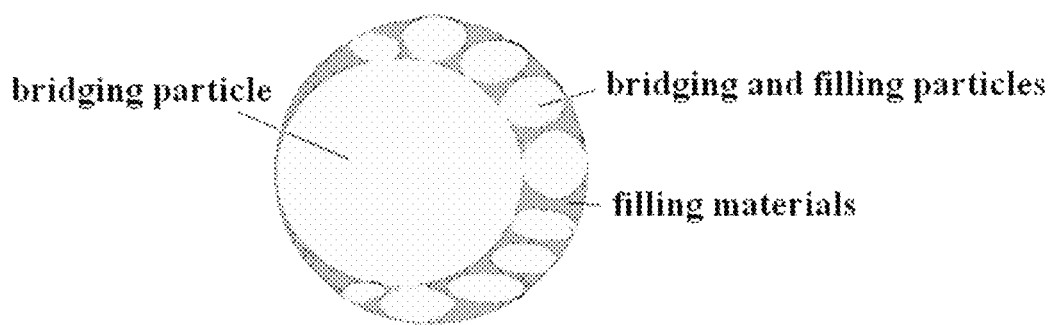
FIG. 1 is a schematic diagram of an action mechanism of bridging, filling and blocking functions of calcium carbonate.
Figure 2:
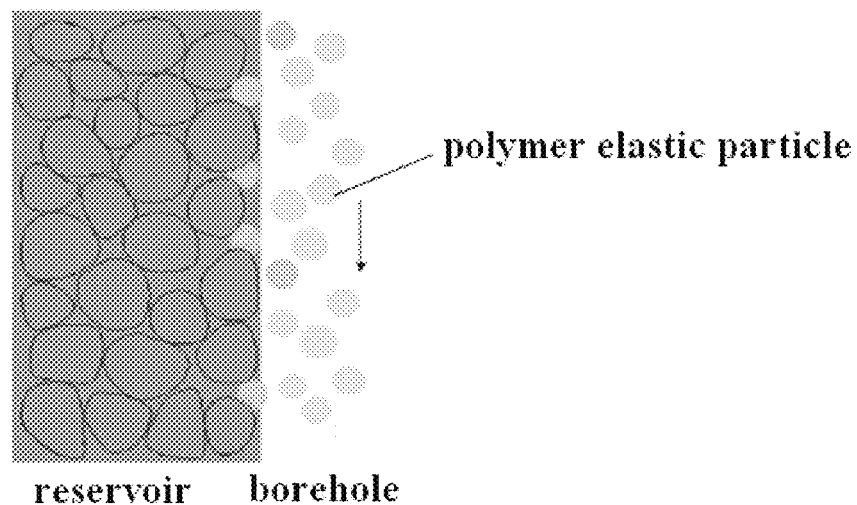
FIG. 2 is a schematic diagram of inserting and blocking functions of the reservoir protecting agent of the present invention.

Hereunder some embodiments of the present invention will be detailed. It should be appreciated that the embodiments described here are only provided to describe and explain the present invention but shall not be deemed as constituting any limitation to the present invention.

The endpoint values and any value in the ranges disclosed in the present invention are not limited to the exact ranges or values. Instead those ranges or values shall be comprehended as encompassing values that are close to those ranges or values. For numeric ranges, between the endpoint values of the ranges, between the endpoint values of the ranges and the individual point values, and between the individual point values can be combined to obtain one or more new numeric ranges which shall be deemed as having been disclosed specifically in this document.

In a first aspect, an intermediate product of a reservoir protecting agent, wherein the intermediate product of a reservoir protecting agent is made of raw materials comprising acrylamide, a cationic monomer, a cross-linking agent, an initiator, a toughening material and water, and based on the raw materials of 100 parts by weight, the acrylamide is present in 8-30 parts by weight, including 10-25 parts by weight, the cationic monomer is present in 1-10 parts by weight, including 2-5 parts by weight, the cross-linking agent is present in 0.01-0.5 parts by weight, including 0.01-0.05 parts by weight, the initiator is present in 0.01-0.1 parts by weight, including 0.02-0.05 parts by weight, and the toughening material is present in 5-25 parts by weight, including 8-15 parts by weight.

In the intermediate product of a reservoir protecting agent of the present invention, in order to further improve the capability of the drilling fluid to protect the reservoir and enhance the capability of the drilling fluid to stabilize well walls, preferably, based on the raw materials of 100 parts by weight, the acrylamide is present in 10-25 parts by weight, the cationic monomer is present in 2-5 parts by weight, the cross-linking agent is present in 0.01-0.05 parts by weight, the initiator is present in 0.02-0.05 parts by weight, and the toughening material is present in 8-15 parts by weight. Those skilled in the art should understand that, in the previous raw materials, the use amount of water meets the condition that the parts by weight of all components constituting the raw materials have a sum of 100.

In the intermediate product of a reservoir protecting agent of the present invention, preferably, the cationic monomer is a quaternary ammonium compound, and further preferably is at least one of dimethyl diallyl ammonium halide (such as dimethyl diallyl ammonium chloride, and dimethyl diallyl ammonium bromide), methacryloyloxyethyl trimethyl ammonium halide (such as methacryloyloxyethyl trimethyl ammonium chloride, and methacryloyloxyethyl trimethyl ammonium bromide), acryloyloxyethyl trimethyl ammonium halide (such as acryloyloxyethyl trimethyl ammonium chloride, acryloyloxyethyl trimethyl ammonium bromide), alkyl dimethyl benzyl ammonium halide, and alkyl trimethyl ammonium halide, and still further preferably, the alkyl in alkyl dimethyl benzyl ammonium halide is alkyl of C8-C20 (such as dodecyl dimethyl benzyl ammonium chloride, hexadecyl dimethyl benzyl ammonium bromide, and octadecyl dimethyl benzyl ammonium chloride), and the alkyl in alkyl trimethyl ammonium halide is alkyl of C8-C20 (such as dodecyl trimethyl ammonium chloride, hexadecyl trimethyl ammonium bromide, and octadecyl trimethyl ammonium chloride).

In the intermediate product of a reservoir protecting agent of the present invention, there is no particular restriction on the cross-linking agent, i.e., the cross-linking agent may be any cross-linking agent commonly used in the art, preferably the cross-linking agent is at least one of N,N'-methylene bis-acrylamide, divinyl benzene, and glutaraldehyde.

In the intermediate product of a reservoir protecting agent of the present invention, there is no particular restriction on the initiator, i.e., the initiator may be any initiator commonly used in the art, preferably the initiator is persulfate, and more preferably is at least one of ammonium persulfate, potassium persulfate and sodium persulfate.

In the intermediate product of a reservoir protecting agent of the present invention, there is no particular restriction on the toughening material, i.e., the toughening material may be any toughening material commonly used in the art, preferably the toughening material is starch and/or bentonite.

In a second aspect, the present invention provides a method for preparing the intermediate product of a reservoir protecting agent, wherein the method comprises: mixing the acrylamide, the cationic monomer, the cross-linking agent, the toughening material and the water, adding the initiator into the obtained mixture for reaction, and then drying and smashing the reaction product.

Preferably, the method of mixing the acrylamide, the cationic monomer, the cross-linking agent, the toughening material and the water includes: (1) adding the acrylamide, the cationic monomer and the cross-linking agent into water for dissolving, and stirring evenly; (2) adding the toughening material into the mixture of step (1), and stirring evenly; and (3) stirring the mixture of step (2) under the protective atmosphere, wherein the protective atmosphere may be nitrogen and/or inert gas, and the stirring time in step (3) may be 20-30 min.

Preferably, the reaction condition includes: the temperature is 30-60° C., the time is 3-5 h. Maintaining the protective atmosphere and stirring can be stopped after the reaction.

Preferably, the drying condition includes: the temperature is 50-150° C., and the time is 10-24 h.

In the present invention, there is no particular restriction on the size of the granularity of the product obtained through smashing, and the diameter of the reservoir protecting agent made from the product obtained through smashing should be larger than that of the pore of the reservoir.

In a third aspect, the present invention provides a reservoir protecting agent, wherein the reservoir protecting agent comprises an intermediate product, base, salt and water, and based on 100 parts by weight of the reservoir protecting agent, the intermediate product is present in 5-40 parts by weight, including 10-30 parts by weight, the base is present in 1-10 parts by weight, including 2-5 parts by weight, and the salt is present in 1-12 parts by weight, including 5-10 parts by weight, and wherein the intermediate product is the intermediate product of a reservoir protecting agent of the present invention.

In the reservoir protecting agent of the present invention, in order to further improve the capability of the drilling fluid to protect the reservoir and enhance the capability of the drilling fluid to stabilize well walls, preferably, based on 100 parts by weight of the reservoir protecting agentf, the intermediate product is present in 10-30 parts by weight, the base is present in 2-5 parts by weight, and the salt is present in 5-10 parts by weight. Those skilled in the art should understand that in the previous reservoir protecting agent, the use amount of water meets the condition that the parts by weight of all components constituting the reservoir protecting agent have a sum of 100.

In the reservoir protecting agent of the present invention, there is no particular restriction on the base, i.e., the base may be any base commonly used in the art, preferably, the base is at least one of sodium hydrate, potassium hydroxide, sodium carbonate, potassium carbonate, sodium bicarbonate and potassium bicarbonate.

In the reservoir protecting agent of the present invention, there is no particular restriction on the salt, i.e., the salt may be any salt commonly used in the art, preferably the salt is at least one of sodium chloride, potassium chloride, calcium chloride, sodium formate, potassium formate and cesium formate.

In the reservoir protecting agent of the present invention, preferably, the reservoir protecting agent further comprises bactericide, and based on 100 parts by weight of reservoir protecting agent, the bactericide is present in 0.03-2 parts by weight, and further preferably is 0.05-1 parts by weight.

Preferably, the bactericide is an adsorptive bactericide, and further preferably is at least one of alkyl trimethyl ammonium halide, alkyl halogenated pyridine and alkyl dimethyl benzyl ammonium halide. More further preferably, the alkyl in alkyl trimethyl ammonium halide is alkyl of C8-C20 (such as dodecyl trimethyl ammonium chloride, hexadecyl trimethyl ammonium bromide, and octadecyl trimethyl ammonium chloride), the alkyl in alkyl halogenated pyridine is alkyl of C8-C20 (such as dodecylpyridinium chloride, hexadecylpyridinium chloride, and octadecylpyridinium bromide), and the alkyl in alkyl dimethyl benzyl ammonium halide is alkyl of C8-C20 (such as dodecyl dimethyl benzyl ammonium chloride, hexadecyl dimethyl benzyl ammonium bromide, and octadecyl dimethyl benzyl ammonium chloride).

In a fourth aspect, the present invention provides a method for preparing the reservoir protecting agent of the present invention, wherein the method comprises: mixing the intermediate product of a reservoir protecting agent of the present invention, the base, the salt, a selectable bactericide and the water.

In the present invention, preferably, the mixing method comprises: first mixing the intermediate product of a reservoir protecting agent, the base and the water (stirring for 5-20 h), and then mixing the obtained mixture with the salt and selectable bactericide (stirring for 0.5-2 h); or The mixing method comprises: first mixing the intermediate product of a reservoir protecting agent, the base, a selectable bactericide and the water (stirring for 5-20 h), and then mixing the obtained mixture with the salt (stirring for 0.5-2 h). Those skilled in the art should understand that in the method for preparing the reservoir protecting agent, the "selectable" bactericide refers to adding a corresponding use amount of bactericide during preparation when the reservoir protecting agent contains the bactericide, and when the reservoir protecting agent does not contain the bactericide, there is no need to add a corresponding amount of bactericide during preparation.

In a fifth aspect, the present invention further provides a drilling fluid, wherein the drilling fluid contains the reservoir protecting agent of the present invention. Preferably, in the drilling fluid, the content of the reservoir protecting agent of the present invention is 1-5% (the percentage is the ratio of mass to volume, i.e., based on the drilling fluid of 100 ml, the use amount of the reservoir protecting agent is 1-5 g). There is no special limit to the system of the drilling fluid containing the reservoir protecting agent of the present invention, and it can be conventionally various drilling fluid systems in the art, and it is only required to add the reservoir protecting agent of the present invention to the conventional drilling fluid systems.

In a sixth aspect, the present invention provides a use of the intermediate product of a reservoir protecting agent of the present invention or the reservoir protecting agent of the present invention or the drilling fluid of the present invention in drilling well of a reservoir section.

The reservoir of the present invention may be the reservoir with cracks or reservoir with pores. That is, the intermediate product of a reservoir protecting agent of the present invention or the reservoir protecting agent of the present invention or the drilling fluid containing the reservoir protecting agent of the present invention is adapted to applications of blocking and protecting the reservoir in the reservoir with cracks or reservoir with pores during the process of drilling well.

EXAMPLES

Hereunder the present invention will be detailed in some examples but it should be noted that the present invention are not limited to those examples. In the following examples and comparative examples unless otherwise specified all of the materials are commercially available and all of the methods are conventional method in the art.

Example 1

Add 20 kg of acrylamide, 4 kg of dimethyl diallyl ammonium chloride and 0.01 kg of N,N'-methylene bis-acrylamide into 67.96 kg of water, fully dissolving, and then add 8 kg of bentonite, stirring evenly. Add the aforementioned reaction fluid in a reactor provided with a stirrer, a condenser pipe, and a thermometer, introduce nitrogen for protection, stir for 20 min, then adjust the temperature to 60° C., add 0.03 kg of ammonium persulfate, stop introducing nitrogen and stirring, and react for 3 h. Take out the reaction product, dry the same at 105° C. for 15 h, and smash the same to obtain the intermediate product of a reservoir protecting agent in a granulated shape.

Add 10 kg of the intermediate product and 5 kg of sodium carbonate into 79.95 kg of water, continuously stirring for 10 h, and then add 5 kg of sodium chloride and 0.05 kg of octadecyl trimethyl ammonium chloride, continuously stirring for 0.5 h, to obtain the elastic polymer particle reservoir protecting agent.

Prepare the drilling fluid according to the following formula: 2% of the elastic polymer particle reservoir protecting agent, 4% of sodium bentonite (commercially available from Anyang Yihe Bentonite Co., Ltd.), 0.2% of KPAM (commercially available from Potassium Polyacrylate of Shandong Yanggu North River Chemical Engineering Limited Company), 0.2% of PAC-HV (commercially available from Polyanionic Cellulose of Shandong Yanggu North River Chemical Engineering Limited Company), 0.2% of XY-27 (commercially available from Zwitterionic Polymer Viscosity Reducer from Shandong Deshunyuan Petroleum Sci.& Tech. Co. Ltd), 2.5% of SPNH (commercially available from Brown coal resin of Shandong Deshunyuan Petroleum Sci. & Tech. Co. Ltd), 2% of FF-I (commercially available from High Acid Soluble Sulfonated Asphalt of Shandong Deshunyuan Petroleum Sci.& Tech. Co. Ltd), 0.2% of KOH, and the rest being water. In the previous drilling fluid, each percentage is the ratio of mass to volume, for example, 2% of the elastic polymer particle reservoir protecting agent refers to the amount of the elastic polymer particle reservoir protecting agent in 100 ml of drilling fluid is 2 g.

Example 2

Add 25 kg of acrylamide, 5 kg of methacryloyloxyethyl trimethyl ammonium chloride and 0.02 kg of glutaraldehyde into 59.93 kg of water, fully dissolving, and then add 10 kg of starch, stirring evenly. Add the aforementioned reaction fluid in a reactor provided with a stirrer, a condenser pipe, and a thermometer, introduce nitrogen for protection, stir for 30 min, then adjust the temperature to 50° C., add 0.05 kg of potassium persulfate, stop introducing nitrogen and stirring, and react for 4 h. Take out the reaction product, dry the same at 110° C. for 12 h, and smash the same to obtain the intermediate product of a reservoir protecting agent in a granulated shape.

Add 20 kg of the intermediate product, 3 kg of potassium hydroxide, and 0.3 kg of hexadecylpyridinium chloride into 69.7 kg of water, continuously stirring for 10 h, and then add 7 kg of potassium chloride, continuously stirring for 1 h, to obtain the elastic polymer particle reservoir protecting agent.

Preparing the drilling fluid according to the method of example 1, except that using the elastic polymer particle reservoir protecting agent obtained in this example.

Example 3

Add 10 kg of acrylamide, 2 kg of dodecyl dimethyl benzyl ammonium chloride and 0.05 kg of divinyl benzene into 72.93 kg of water, fully dissolving, and then add 15 kg of bentonite, stirring evenly. Add the aforementioned reaction fluid in a reactor provided with a stirrer, a condenser pipe, and a thermometer, introduce nitrogen for protection, stir for 25 min, then adjust the temperature to 40° C., add 0.02 kg of sodium persulfate, stop introducing nitrogen and stirring, and react for 5 h. Take out the reaction product, dry the same at 90° C. for 18 h, and smash the same to obtain the intermediate product of a reservoir protecting agent in a granulated shape.

Add 30 kg of the intermediate product and 2 kg of sodium hydrate into 57 kg of water, continuously stirring for 15 h, and then add 10 kg of sodium formate and 1 kg of dodecyl dimethyl benzyl ammonium chloride, continuously stirring for 0.5 h, to obtain the elastic polymer particle reservoir protecting agent.

Preparing the drilling fluid according to the method of example 1, except that using the elastic polymer particle reservoir protecting agent obtained in this example.

Example 4

According to the method of example 1, except that in the method for preparing the intermediate product of a reservoir protecting agent, the amounts of the acrylamide, dimethyl diallyl ammonium chloride, N,N'-methylene bis-acrylamide, water, bentonite, and ammonium persulfate are respectively 8 kg, 8 kg, 0.5 kg, 78.49 kg, 5 kg, and 0.01 kg.

Preparing the drilling fluid according to the method of example 1, except that using the elastic polymer particle reservoir protecting agent obtained in this example.

Example 5

According to the method of example 1, except that in the method for preparing the reservoir protecting agent, the amounts of the intermediate product, sodium carbonate, water, sodium chloride, and octadecyl trimethyl ammonium chloride are respectively 6 kg, 1 kg, 88.5 kg, 3 kg, and 1.5 kg.

Preparing the drilling fluid according to the method of example 1, except that using the elastic polymer particle reservoir protecting agent obtained in this example.

Comparative Example 1

Prepare the drilling fluid according to the following formula: 2% of ultrafine calcium carbonate (commercially available from Zibo Jianzhi Industry & Trade Co., Ltd, granularity is 800-2000 meshes), 4% of sodium bentonite (commercially available from Anyang Yihe Bentonite Co., Ltd.), 0.2% of KPAM (commercially available from Potassium Polyacrylate of Shandong Yanggu North River Chemical Engineering Limited Company), 0.2% of PAC-HV (commercially available from Polyanionic Cellulose of Shandong Yanggu North River Chemical Engineering Limited Company), 0.2% of XY-27 (commercially available from Zwitterionic Polymer Viscosity Reducer of Shandong Deshunyuan Petroleum Sci.& Tech. Co. Ltd), 2.5% of SPNH (commercially available from Brown coal resin of Shandong Deshunyuan Petroleum Sci.& Tech. Co. Ltd), 2% of FF-I (commercially available from High Acid Soluble Sulfonated Asphalt of Shandong Deshunyuan Petroleum Sci.& Tech. Co. Ltd), 0.2% of KOH, and the rest being water.

Comparative Example 2

Prepare the drilling fluid according to the following formula: 4% of sodium bentonite (commercially available from Anyang Yihe Bentonite Co., Ltd.), 0.2% of KPAM (commercially available from Potassium Polyacrylate of Shandong Yanggu North River Chemical Engineering Limited Company), 0.2% of PAC-HV (commercially available from Polyanionic Cellulose of Shandong Yanggu North River Chemical Engineering Limited Company), 0.2% of XY-27 (commercially available from Zwitterionic Polymer Viscosity Reducer of Shandong Deshunyuan Petroleum Sci.& Tech. Co. Ltd), 2.5% of SPNH (commercially available from Brown coal resin of Shandong Deshunyuan Petroleum Sci.& Tech. Co. Ltd), 2% of FF-I (commercially available from High Acid Soluble Sulfonated Asphalt of Shandong Deshunyuan Petroleum Sci.& Tech. Co. Ltd), 0.2% of KOH, and the rest being water.

Test Example

The method for measuring various parameters involved in the present invention is as follows:
(1) Measurements on API Filter Loss
According to GB/T 16783.1-2006, measure API filter loss of the drilling fluid in examples 1-5 and comparative examples 1 and 2 at 24±3° C. The results are shown in Table 1.

(2) Measurements on Apparent Viscosity
According to GB/T 16783.1-2006, measure the apparent viscosity of the drilling fluid in examples 1-5 and comparative examples 1 and 2 at 24±3° C. The results are shown in Table 1.
(3) Measurements on Recovery Rate of Shale
Weigh two test samples of 50.0 g of air-dried mud shale rock debris of 6-10 meshes (the recovery rate in distilled water is 20-40%), respectively dispose in a high temperature pot already filled with 350 mL of distilled water and 350 mL of drilling fluid (the drilling fluid in examples 1-5 and comparative examples 1 and 2) and fasten the cover tightly. Place the same in a roller furnace at 77° C. for 16 h, take it out and cool it down, then pour into a 0.45 mm standard sieve (40 meshes), after rinse with clean water, collect rock debris residue on sieve in a watch glass, dry at a constant temperature of 105±3° C. for 4 h, take it out and cool it down, place in air for 24 h and weigh. The recovery rate of shale is calculated according to the following formula. The results are shown in Table 1.

$$F = \frac{m_H - m_W}{m_W} \times 100\%$$

In the formula:
F-shale recovery improving rate, %;
$m_H$-mass of rock debris recovered from the drilling fluid, g; and
$m_W$-mass of rock debris recovered from the distilled water, g.
(4) Measurements on Blocking Rate and Permeability Recovery Rate
The reservoir protection performances are tested according to SYT 6540-2002 "Lab Testing Method of Drilling and Completion Fluids Damaging Oil Formation", on a SH-1 high temperature and high pressure dynamic filter tester. Measure to obtain the size of the core, vacuumize and saturate using standard saline water for 48 h, measure in a forward direction oil phase permeability $K_1$ of the core (i.e., the initial core permeability in Table 1); and block the core in the dynamic filter tester using the prepared drilling fluid (the drilling fluid in examples 1-5 and comparative examples 1 and 2), after blocking is completed, eliminate mud cake at the blocking end, measure in a forward direction oil phase permeability $K_2$ of the core, and calculate the blocking rate $BR=(K_1-K_2)/K_1\times100\%$. Then measure the backward direction oil phase permeability $K_3$ of the core after blocking, and calculate the permeability recovery rate $RR=K_3/K_1\times100\%$. The results are shown in Table 1.

TABLE 1

| drilling fluid | API filter loss/ ml | apparent viscosity/ (mPa · s) | recovery rate of shale/% | initial core permeability $K_1$/ ($10^{-3}$ μm$^2$) | blocking rate/% | permeability recovery rate/% |
|---|---|---|---|---|---|---|
| Example 1 | 7.7 | 19 | 91.2 | 510.2 | 97.8 | 96.9 |
| Example 2 | 7.5 | 21 | 93.5 | 640.8 | 95.9 | 94.6 |
| Example 3 | 7.2 | 18 | 95.3 | 750.2 | 99.2 | 95.2 |
| Example 4 | 8.0 | 20 | 87.9 | 518.5 | 90.2 | 89.2 |
| Example 5 | 7.9 | 19 | 88.7 | 525.7 | 91.3 | 90.4 |
| Comparative Example 1 | 8.5 | 19.5 | 75.4 | 512.7 | 84.2 | 61.3 |
| Comparative Example 2 | 9.2 | 19 | 73.8 | 529.6 | 57.8 | 68.6 |

Upon comparison between the results of examples 1-5 and comparative examples 1 and 2 in Table 1, it can be seen that in view of the API filter loss, both of the reservoir protecting agent of the present invention and the ultrafine calcium carbonate have effect of reducing the filter loss, but the effect of reducing the filter loss of the reservoir protecting agent of the present invention is superior to that of the ultrafine calcium carbonate.

Upon comparison between the results of examples 1-5 and comparative examples 1 and 2 in Table 1, it can be seen that the reservoir protecting agent of the present invention has no bad influence on performances of the drilling fluid such the apparent viscosity.

Upon comparison between the results of examples 1-5 and comparative examples 1 and 2 in Table 1, it can be seen that in view of the recovery rate of shale, the reservoir protecting agent of the present invention can remarkably improve the recovery rate of shale of the drilling fluid, which indicates that the reservoir protecting agent of the present invention has stronger absorption capacity at the surface of the rock debris, can form a protective layer for the polymer elastic particles at the surface of the rock debris, and stop the rock debris from dispersion, and is beneficial for maintaining the well walls stable, the performances of the drilling fluid stable and the protection for the reservoir, while the ultrafine calcium carbonate basically has no influence on the recovery rate of shale.

Upon comparison between the results of examples 1-5 and comparative examples 1 and 2 in Table 1, it can be seen that in view of the blocking rate, both of the reservoir protecting agent of the present invention and the ultrafine calcium carbonate can improve the blocking rate, but the blocking rate of all the reservoir protecting agent of the present invention is more than 90%, preferably more than 95%, and the blocking effect is obviously better.

Upon comparison between the results of examples 1-5 and comparative examples 1 and 2 in Table 1, it can be seen that in view of the permeability recovery rate, the reservoir protecting agent of the present invention can remarkably improve the permeability recovery rate, and the permeability recovery rate of the core blocked by the drilling fluid added in the reservoir protecting agent of the present invention is more than 89%, preferably more than 94%, which indicates that the blocking function of the reservoir protecting agent of the present invention is easily relieved, while the permeability recovery rate after adding the ultrafine calcium carbonate is, on the contrary, lower down, the reason of which may be the particles of the calcium carbonate enter into inside the pore of the core to jam the core.

The abovementioned results show that the reservoir protecting agent of the present invention has a good effect of protecting the reservoir, can further enhance the capability of the drilling fluid to stable the well walls, and has no bad influence on other performances of the drilling fluid.

Further, upon comparison between the results of example 1 and example 4 in Table 1, it can be seen that in the raw materials for preparing the intermediate product of a reservoir protecting agent, when based on the raw materials of 100 parts by weight, the acrylamide is present in 10-25 parts by weight, the cationic monomer is present in 2-5 parts by weight, the cross-linking agent is present in 0.01-0.05 parts by weight, the initiator is present in 0.02-0.05 parts by weight, the toughening material is present in 8-15 parts by weight, it can further improve the capability of the drilling fluid to protect the reservoir and enhance the capability of the drilling fluid to stabilize well walls.

Further, upon comparison between the results of example 1 and example 5 in Table 1, it can be seen that when based on 100 parts by weight of the reservoir protecting agent, the intermediate product is present in 10-30 parts by weight, the base is present in 2-5 parts by weight, and the salt is present in 5-10 parts by weight, it can further improve the capability of the drilling fluid to protect the reservoir and enhance the capability of the drilling fluid to stabilize well walls.

While some preferred embodiments of the present invention are described above, the present invention is not limited to the details in those embodiments. Those skilled in the art can make modifications and variations to the technical scheme of the present invention without departing from the spirit of the present invention. However, all these modifications and variations shall be deemed as falling into the protected scope of the present invention.

In addition, it should be appreciated that the technical features described in the above embodiments can be combined in any appropriate manner provided that there is no conflict among the technical features in the combination. To avoid unnecessary iteration, such possible combinations are not described here in the present invention.

Moreover, different embodiments of the present invention can be combined freely as required as long as the combinations don't deviate from the ideal and spirit of the present invention. However, such combinations shall also be deemed as falling into the protected scope disclosed in the present invention.

The invention claimed is:

1. An intermediate product of a reservoir protecting agent, wherein the intermediate product of a reservoir protecting agent comprises the reaction product of acrylamide, a cationic monomer, a cross-linking agent, an initiator, a toughening material and water, and based on 100 parts by weight, the acrylamide is present in 8-30 parts by weight, the cationic monomer is present in 1-10 parts by weight, the cross-linking agent is present in 0.01-0.5 parts by weight, the initiator is present in 0.01-0.1 parts by weight, and the toughening material is present in 5-25 parts by weight.

2. The intermediate product of a reservoir protecting agent according to claim 1, wherein based 100 parts by weight, the acrylamide is present in 10-25 parts by weight, the cationic monomer is present in 2-5 parts by weight, the cross-linking agent is present in 0.01-0.05 parts by weight, the initiator is present in 0.02-0.05 parts by weight, and the toughening material is present in 8-15 parts by weight.

3. The intermediate product of a reservoir protecting agent according to claim 1, wherein
the cationic monomer is a quaternary ammonium compound, and the quaternary ammonium compound is at least one of dimethyl diallyl ammonium halide, methacryloyloxyethyl trimethyl ammonium halide, acryloyloxyethyl trimethyl ammonium halide, alkyl dimethyl benzyl ammonium halide and alkyl trimethyl ammonium halide;
the cross-linking agent is at least one of N,N'-methylene bis-acrylamide, divinyl benzene and glutaraldehyde;
the initiator is persulfate, and the persulfate is at least one of ammonium persulfate, potassium persulfate and sodium persulfate; and
the toughening material is at least one of starch and bentonite.

4. The intermediate product of a reservoir protecting agent according to claim 3, wherein the alkyl in the alkyl dimethyl benzyl ammonium halide is alkyl of C8-C20, and the alkyl in alkyl trimethyl ammonium halide is alkyl of C8-C20.

5. The intermediate product of a reservoir protecting agent according to claim 1, wherein the intermediate product of a reservoir protecting agent is prepared by a method comprising: mixing the acrylamide, the cationic monomer, the cross-linking agent, the toughening material and the water, and then adding the initiator into the obtained mixture for reaction, drying and smashing the reaction product.

6. The intermediate product of a reservoir protecting agent according to claim 5, wherein the reaction condition includes: temperature of 30-60° C., and time of 3-5 h.

7. A reservoir protecting agent, wherein the reservoir protecting agent comprises an intermediate product, base, salt and water, and based on 100 parts by weight of the reservoir protecting agent, the intermediate product is present in 5-40 parts by weight, the base is present in 1-10 parts by weight, and the salt is present in 1-12 parts by weight, and wherein the intermediate product is the intermediate product of a reservoir protecting agent according to claim 1.

8. The reservoir protecting agent according to claim 7, wherein based on 100 parts by weight of the reservoir protecting agent, the intermediate product is present in 10-30 parts by weight, the base is present in 2-5 parts by weight, and the salt is present in 5-10 parts by weight.

9. The reservoir protecting agent according to claim 7, wherein based on 100 parts by weight, the acrylamide is present in 10-25 parts by weight, the cationic monomer is present in 2-5 parts by weight, the cross-linking agent is present in 0.01-0.05 parts by weight, the initiator is present in 0.02-0.05 parts by weight, and the toughening material is present in 8-15 parts by weight.

10. The reservoir protecting agent according to claim 9, wherein based on 100 parts by weight of the reservoir protecting agent, the intermediate product is present in 10-30 parts by weight, the base is present in 2-5 parts by weight, and the salt is present in 5-10 parts by weight.

11. The reservoir protecting agent according to claim 7, wherein the reservoir protecting agent further comprises bactericide, and based on 100 parts by weight of the reservoir protecting agent, the bactericide is present in 0.03-2 parts by weight.

12. The reservoir protecting agent according to claim 11, wherein based on 100 parts by weight of the reservoir protecting agent, the bactericide is present in 0.05-1 parts by weight.

13. The reservoir protecting agent according to claim 11, wherein the bactericide is adsorptive bactericide, and the adsorptive bactericide is at least one of alkyl trimethyl ammonium halide, alkyl halogenated pyridine and alkyl dimethyl benzyl ammonium halide.

14. The reservoir protecting agent according to claim 13, wherein the alkyl in the alkyl trimethyl ammonium halide is alkyl of C8-C20, the alkyl in the alkyl halogenated pyridine is alkyl of C8-C20, and the alkyl in the alkyl dimethyl benzyl ammonium halide is alkyl of C8-C20.

15. The reservoir protecting agent according to claim 7, wherein the base is at least one of sodium hydrate, potassium hydroxide, sodium carbonate, potassium carbonate, sodium bicarbonate and potassium bicarbonate; and the salt is at least one of sodium chloride, potassium chloride, calcium chloride, sodium formate, potassium formate and cesium formate.

16. The reservoir protecting agent according to claim 7, wherein the reservoir protecting agent is prepared by a method comprising: mixing the intermediate product of a reservoir protecting agent, the base, the salt, a selectable bactericide and the water.

17. The reservoir protecting agent according to claim 16, wherein the mixing method comprises one of: mixing the intermediate product of a reservoir protecting agent, the base and the water, and then mixing the obtained mixture with the salt and the selectable bactericide; or mixing the intermediate product of a reservoir protecting agent, the base, the selectable bactericide and the water, and then mixing the obtained mixture with the salt.

18. A drilling fluid, wherein the drilling fluid contains the reservoir protecting agent according to claim 7.

19. The drilling fluid according to claim 18, wherein based on 100 parts by weight of the reservoir protecting agent, the intermediate product is present in 10-30 parts by weight, the base is present in 2-5 parts by weight, and the salt is present in 5-10 parts by weight.

20. The drilling fluid according to claim 18, wherein based on 100 ml of the drilling fluid, the reservoir protecting agent is present in 1-5 g.

* * * * *